United States Patent
Honsinger et al.

(10) Patent No.: US 6,278,791 B1
(45) Date of Patent: *Aug. 21, 2001

(54) LOSSLESS RECOVERY OF AN ORIGINAL IMAGE CONTAINING EMBEDDED DATA

(75) Inventors: Chris W. Honsinger, Webster; Paul W. Jones, Churchville; Majid Rabbani, Pittsford; James C. Stoffel, Rochester, all of NY (US)

(73) Assignee: Eastman Kodak Company, Rochester, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/074,282

(22) Filed: May 7, 1998

(51) Int. Cl.⁷ ........................................ G06K 9/00
(52) U.S. Cl. ..................... 382/100; 128/922; 430/140
(58) Field of Search .............. 380/23; 382/248, 382/232, 100; 430/140; 707/104, 101; 705/54; 128/922

(56) References Cited

U.S. PATENT DOCUMENTS

| | | | |
|---|---|---|---|
| 5,646,997 | * 7/1997 | Barton | 380/23 |
| 5,881,176 | * 3/1999 | Keith et al. | 382/248 |
| 5,912,972 | * 6/1999 | Barton | 380/23 |
| 5,966,465 | * 10/1999 | Keith et al. | 382/232 |
| 6,085,198 | * 7/2000 | Skinner et al. | 707/103 |
| 6,180,312 | * 1/2001 | Edwards | 430/140 |

OTHER PUBLICATIONS

U.S. application No. 08/565,804, Daly et al., filed Nov. 30, 1995.
U.S. application No. 08/596,818, Daly, filed Feb. 5, 1996.
U.S. application No. 08/768,679, Honsinger, et al., filed Dec. 18, 1996.
U.S. application No. 08/848,112, Honsinger, et al., filed Apr. 28, 1997.
U.S. Department of Commerce, Technology Administration, National Institute of Standards and Technology, Federal Information Processing Standards Publication (FIPS) No. 180, "Secure Hash Standard," May 11, 1993, pp. 1–20.
Bruce Schneier, "Applied Cryptography, Second Edition, protocols, Algorithms, and Source Code in C," 1996, Chapter 16, pp. 369–395, plus Errata.
William K. Pratt, "Digital Image Processing," Second Edition, pp. 196–200.

* cited by examiner

Primary Examiner—Leo Boudreau
Assistant Examiner—M. B. Choobin
(74) Attorney, Agent, or Firm—Edward Dugas; Stephen H. Shaw

(57) ABSTRACT

The method and system embeds digital meta-data into an original image in such a way that the meta-data can be completely removed at a later time to allow loss less recovery of the original image. The loss less recovery of the original image allows for a digital signature of the image to be embedded in the image itself and later recovered and used to verify the authenticity of a received image.

26 Claims, 8 Drawing Sheets

LOSSLESS RECOVERY OF AN ORIGINAL IMAGE CONTAINING EMBEDDED DATA

CROSS-REFERENCE TO RELATED APPLICATIONS

The present application is related to U.S. application Ser. No. 08/565,804, filed Nov. 30, 1995, by Scott J. Daly, et al., and entitled, "Method For Embedding Digital Information In An Image," U.S. application Ser. No. 08/596,818, filed Feb. 5, 1996, by Scott J. Daly, and entitled, "Method and Apparatus For Hiding One Image or Pattern Within Another;" U.S. application Ser. No. 08/768,679, filed Dec. 18, 1996, by Chris W. Honsinger, et al., and entitled, "Method for Detecting Rotation and Magnification in Images;" and to U.S. application Ser. No. 08/848,112, filed Apr. 28, 1997, by Chris W. Honsinger, et al., and entitled, "Method for Generating an Improved Carrier for Use in an Image Data Embedding Application."

FIELD OF THE INVENTION

The invention relates generally to the field of digital image processing, and in particular to a technique for embedding digital data in an original image in such a manner that the combined image and embedded data are directly viewable with only minimal visible degradation, and the embedded data can be completely removed at a later time to allow loss less recovery of the original image.

BACKGROUND OF THE INVENTION

In some digital imaging systems, it is desirable to convey ancillary information along with the actual data that comprises an original image. This ancillary information might be directly derived from the image, or it might represent additional information that is related to, but not directly derived from, the image itself. In either case, this ancillary information is called image "meta-data" throughout this text.

An example of meta-data that is directly derived from the original image data is a hash value. A hash value is a very compact representation of the much larger original image data set, and it is generated using a hashing function. An example of a useful hashing function is found in U.S. Department of Commerce Technology Administration National Institute of Standards and Technology, FIPS PUB 180, "Secure Hash Standard," May 11, 1993, pp. 1–20. This hashing function will produce a hash value of length 162 bits, irrespective of the number of pixel values that are input to the hashing function. Other hashing functions may produce hash values of lengths other than 162 bits. While a hash value is not entirely unique to a given image (i.e., the process is a many-to-one mapping), it can be chosen so as to represent the image with extremely high probability. A hash value can be appended to the original image and then used at a later time to verify that the image has not been modified in any way since the hash value was generated. To prevent tampering of the hash value by unauthorized individuals, it is necessary to encrypt the hash value, thus creating a secure digital signature for the original image data. However, the process of appending the encrypted hash value inhibits the use of standard image formats such as TIFF to convey the combined image and signature information. Furthermore, a signature that is merely appended to an image can be easily removed by deleting the portion of the file containing the signature.

Examples of image meta-data that are not directly derived from, but are related to, the original image include the date/time or geographical location of the point of capture, a unique ID associated with the camera and/or photographer, camera settings used during the capture process, etc. It is possible to merely append such meta-data to the image data, but as with the digital signatures this process inhibits the use of standard image file formats. Some file formats provide segments for user-defined information, but such data is unsecured from tampering and could be easily removed by unauthorized individuals. In present techniques, these issues are resolved by embedding the meta-data within the image itself. Standard image file formats such as TIFF can then be used to convey both image data and meta-data, and proper design of the embedding process allows the image containing the embedded data to be directly viewed with only a minimal loss in quality. The embedding process also provides some level of security in that the meta-data can only be recovered with some knowledge of the embedding process (such as a "key" value). However, a disadvantage of the embedding process is that the original image data is typically corrupted to the extent that exact recovery of the original values is impossible. As a result, current data embedding techniques could not be used for the purpose of image verification where the encrypted hash values (i.e., image signatures) are embedded in the image itself (since the proper hash value could never be re-created from the corrupted image values).

It would therefore be desirable to have a technique that overcomes the aforementioned limitations of present techniques for conveying image meta-data (including digital signatures). Specifically, it is desirable to have a technique that:

1. Embeds meta-data into the original image to produce a single image file that is compatible with standard file formats and is directly viewable without any further processing;

2. Provides a reasonable degree of security for the meta-data to prevent tampering or removal by unauthorized individuals; and 3. Allows exact recovery of the original image data from the combined image and embedded data.

SUMMARY OF THE INVENTION

The present technique is an improvement upon the technique of data embedding that is described in U.S. patent application Ser. No. 08/565,804, Filed Nov. 30, 1995, entitled, "Embedding Digital Information Within an Image Using Carrier Images and Filter Processes" by Daly, et al., and as modified in U.S. patent application Ser. No. 08/848, 112, Filed Apr. 28, 1997, entided, "Method for Generating an Improved Carrier for use in an Image Data Embedding Application Secure Messaging System for use in the Data Hiding" by Honsinger, et al. Using this technique, the image meta-data associated with an original image is first converted to a spatial representation called the message data. Prior to this conversion, the meta-data may also be encrypted for additional security. The message data is then embedded into the original image through the use of a carrier signal as described in U.S. patent application Ser. No. 08/848,112. The carrier used in the embedding process is generated using an embedding key value, which may be publicly known or may be held private in order to prevent unauthorized access to the message data. Since the embedding process produces only minor quality loss, users may display the image containing the embedded data just as they would without the embedding. However, knowledge of the key allows the message data to be extracted from the image containing the embedded data, and the meta-data can then be recovered from the message data. In the present invention, the embedded data can be completely removed, thus allowing the original image data to be recovered exactly.

Briefly summarized, according to one aspect of the present invention, there is provided a method for embedding meta-data into an original n-bit digital image (containing values 0 to N−1, where N=$2^n$) that allows exact recovery of the original image, comprising the steps of:

a) forming a digital message from meta-data;

b) converting the digital message to embedded data; and c) combining the embedded data with the original image using a reversible transform to form an n-bit digital image containing the embedded data.

Apparatus for performing the method is also disclosed.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages:

1. Meta-data information is embedded completely within the image data itself (no need for a separate data file or special image formats, e.g., TIFF could be used).

2. The image containing the embedded data is immediately available for public viewing, without any additional processing.

3. Embedded data cannot be accessed without knowledge of a special key.

4. The embedded data can be removed completely, thus allowing the original image to be recovered exactly.

5. Because the original image can be recovered exactly, a digital signature representing the original image can be embedded directly into the image itself.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
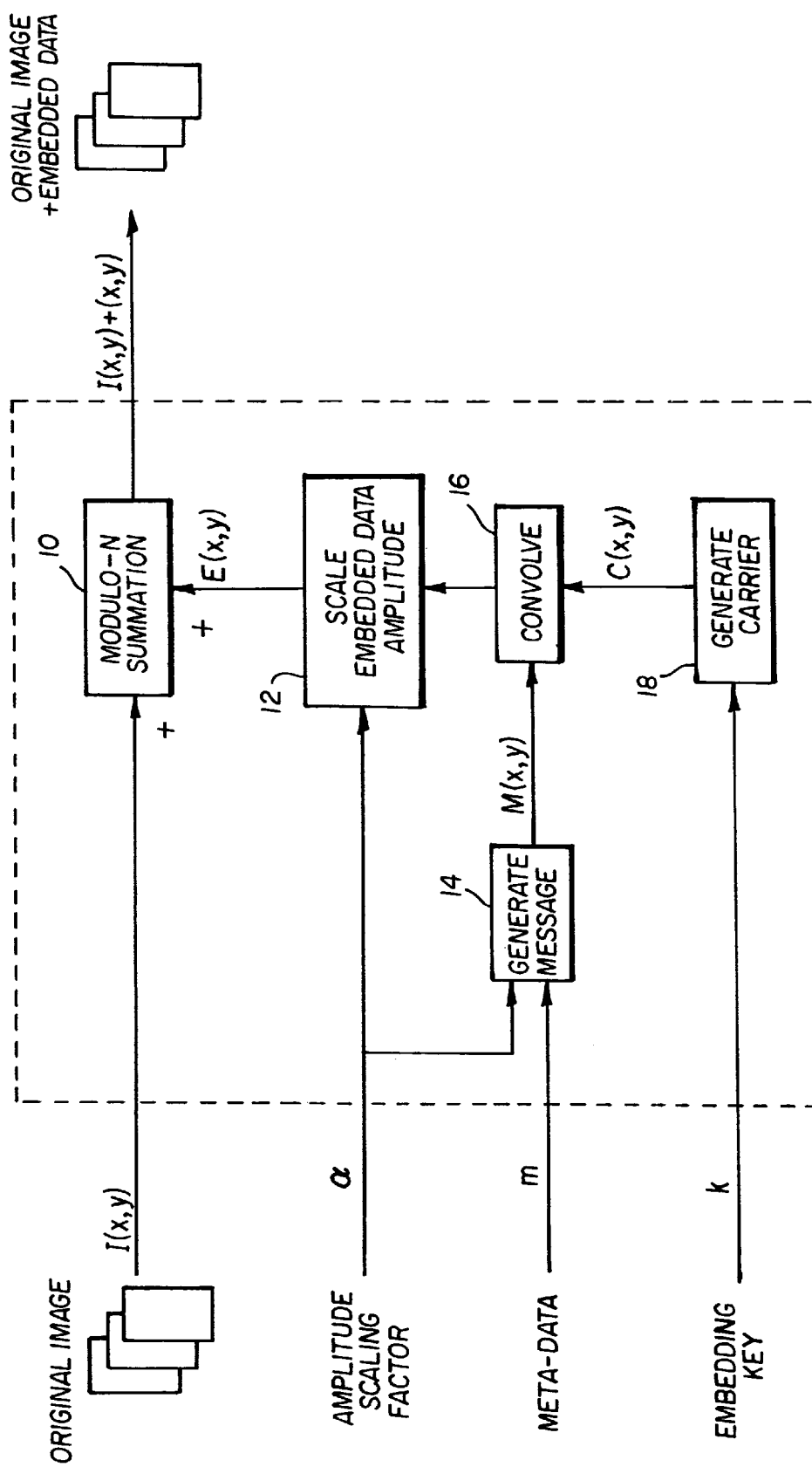
FIG. 1 illustrates in block diagram form, means for embedding meta-data information in an original image so that the original image can later be recovered exactly.

The technique described in the aforementioned U.S. patent application Ser. No. 08/848,112, filed Apr. 28, 1997, is built upon with the present invention to generate an image containing embedded information (the message) is broken down into two process parts: the process of embedding the message into an image; and the process of extracting the embedded message.

In the embedding part, the message and a carrier signal are convolved to form a scrambled image. The scrambled image is then scaled to ensure that the amplitude of the resultant scrambled image is not visually perceptible. Next, the scrambled image is added to the original image to complete the embedding process. The process of data embedding can be mathematically described as $$I'(x,y)=I(x,y)+\alpha M(x,y)*C(x,y) \qquad \text{Equation 1}$$

where I(x, y) denotes the original image, I'(x, y) denotes the image containing the embedded data, M(x, y) denotes the message that is to be embedded in the original image, C(x, y) denotes the carrier signal, M(x, y)*C(x, y) denotes the scrambled image, α is an amplitude scaling factor, and * denotes the process of circular convolution.

The convolution of the carrier with the message distributes the message information throughout the spatial extent of the scrambled image. The amplitude scaling α is chosen to be small enough so that the scrambled image is visually undetectable when combined with the original image, but large enough to be recoverable by the message extraction process. When dealing with 8-bit original images where the pixel values range from 0–255, it has been found that a maximum amplitude of 10 or less is adequate to recover an embedded message that does not perceptibly degrade an original image. In some cases, it is possible to use very small amplitudes, such as using only the values ±1. It is noted that while we have used an amplitude scaling factor to produce a scrambled image with the desired range of values, it is quite possible to use other methods, either separately or in addition to a scaling factor. Examples include a look-up table, where each input value is mapped to a corresponding output value, or a simple constrainer that merely limits the maximum amplitude.

To extract the embedded message, the image I'(x, y) containing the embedded data is cross correlated with the carrier, C(x, y), as described by the following:

$$M'(x,y)=I'(x,y) \circledx C(x,y) \qquad \text{Equation 2}$$

where M'(x, y) is the extracted message, and $\circledx$ denotes the operation of circular cross correlation. Expanding I'(x, y) in Equation 2 yields:

$$\begin{aligned} M'(x, y) &= [I(x, y) + \alpha M(x, y) * C(x, y)] \otimes C(x, y) \qquad \text{Equation 3}\\ &= I(x, y) \otimes C(x, y) + \alpha M(x, y) * \\ &\quad [C(x, y) \otimes C(x, y)] \end{aligned}$$

Equation 3 simply states that the extracted message consists of the sum of two components: one term is the cross-correlation of the original image with the carrier signal; and the second term is the autocorrelation of the carrier signal convolved with a scaled version of the original message. The effect of the first term can be minimized by creating a random carrier that is uncorrelated with the original image. From examining the second term, it is clear that the resolvability of the recovered message is affected by the autocorrelation of the carrier signal $C(x, y)$. To achieve maximum resolvability, the autocorrelation of the carrier signal should be a delta function, $\delta(x, y)$, which from Fourier analysis theory is equivalent to suggesting that the carrier signal should contain all frequencies at equal amplitude. Thus, with proper design of the carrier $C(x, y)$ and sufficient amplitude for the embedded data (determined by $\alpha$ or other means), the original message $M(x, y)$ can be recovered exactly. The design of the carrier is considered later in the section.

Although the original message can be recovered exactly, this does not necessarily mean that the original image can be recovered exactly. Referring to Equation 1, the embedding process can be simplified to:

$$I'(x,y)=I(x,y)+E(x,y) \qquad \text{Equation (4)}$$

where $E(x, y)=\alpha M(x, y)*C(x, y)$ represents the embedded data. Now, given that we have exactly recovered the message $M(x, y)$ and given that we have knowledge of the scaling factor $\alpha$ and carrier $C(x, y)$, we can exactly re-create the embedded data $E(x, y)$. It would seem that we could merely subtract $E(x, y)$ from Equation 4 to recover the original image $I(x, y)$. However, the modified image $I'(x, y)$ is typically constrained to the same range of values as the original image $I(x, y)$, which requires the output of the summation process in Equation 4 to be clipped This clipping process leads to an irreversible loss of data, and the original image data can never be recovered exactly. To allow the exact recovery of the original image data from the combined image and embedded data, there are several approaches.

One approach for exact recovery is to allow the modified image $I'(x, y)$ containing the embedded data to have a greater range of values than the original image $I(x, y)$. For example, if the original image is represented by n bits, then the modified image might be represented with n+1 bits. However, this approach is not preferred as it may render the modified image unusable in many applications, and it is also inefficient for storage and transmission. For example, an 8-bit original image would produce a 9-bit modified image, and many image file formats and image displays are not designed for bit depths greater than 8 bits/pixel per color.

Another approach is to constrain the possible values of the original image to ensure that clipping does not occur when the embedded data is added to it. This approach may be viable in some systems as the original images may not contain any values at the low and high ends of the possible range (for example, in a digital camera system where the dynamic range is limited due to the sensor, etc.). More generally, the loss of a few code values in the bright and dark regions of an image will likely have limited visual impact. However, in a strict sense, this approach does not allow exact recovery of the original image as errors are being introduced even prior to the addition of embedded data.

In the present invention, the approach is to use modulo-N addition in place of regular addition in Equation 4. Modulo-N addition is defined as:

$$(a+b) \text{Mod } N = \text{Remainder of } \left\lfloor \frac{a+b}{N} \right\rfloor \qquad \text{Equation 5}$$

where $\lfloor x \rfloor$ is the largest integer $\leq x$. In the case of an n-bit original image, N is taken to be $2^n$ (e.g., for an 8-bit image, N is 256). Modulo-N addition ensures that the modified image values (produced by adding the original image values and the embedded data values) will always be in the same range as the original image values. Moreover, the modulo-N addition process is a reversible transform when adding two n-bit values, and thus the original image $I(x, y)$ can be exactly recovered with knowledge of the modified image $I'(x, y)$ and the embedded data $E(x, y)$.

The use of modulo-N addition does lead to one potential artifact in the modified image $I'(x, y)$, namely, certain values in the light and dark portions of the image will be reversed in polarity. Depending on the original image values, this artifact may be completely absent or it may be noticeable when viewing the modified image containing the embedded data. To minimize the occurrence of this artifact, it is necessary to keep the amplitude of the embedded data to a minimum. As discussed previously, the embedded data amplitude also influences the ability to recover the message data exactly, so the choice of the amplitude is a trade-off between visual artifacts in the modified image and the ability to recover the message. A means for minimizing the embedded data amplitude while still allowing exact recovery of the message and hence exact recovery of the original image data is described later.

Referring now to FIG. 1, implementation of the present invention is performed by providing as inputs to the data embedding apparatus the following values: 1) a string of n-bit original pixel values (derived by scanning an original image), denoted as $I(x, y)$; 2) an embedded data amplitude scaling factor $\alpha$; 3) a string of bits m, representing meta-data information that is to be embedded within the original image values; and 4) a string of numbers called an embedding key k (which may be private or public).

The amplitude scaling factor $\alpha$ is sent to a message generator 14, where it is combined with the meta-data information m to produce a spatial domain message $M(x, y)$. Embedding the amplitude scaling factor in the image itself eliminates the need to send it as separate side information. However, because the data embedding process can only embed a finite number of bits of total information, it is desirable to limit the number of bits used to represent $\alpha$. As noted previously, it is generally sufficient to limit the maximum embedded data amplitude to a value of 10 or less, so it is entirely possible to use only 3 or 4 bits to represent $\alpha$. Although a variety of methods could be used to generate $M(x, y)$ from the combined meta-data information and amplitude scaling factor, a preferred embodiment is to place delta functions in a periodic array, where the amplitude of the delta functions is modulated by the string of binary values that represent the combined information. The generated message $M(x, y)$ is then directed to a convolver 16, where it is circularly convolved with a random spatial domain carrier signal $C(x, y)$ to produce two-dimensional embedded data.

Figure 7:
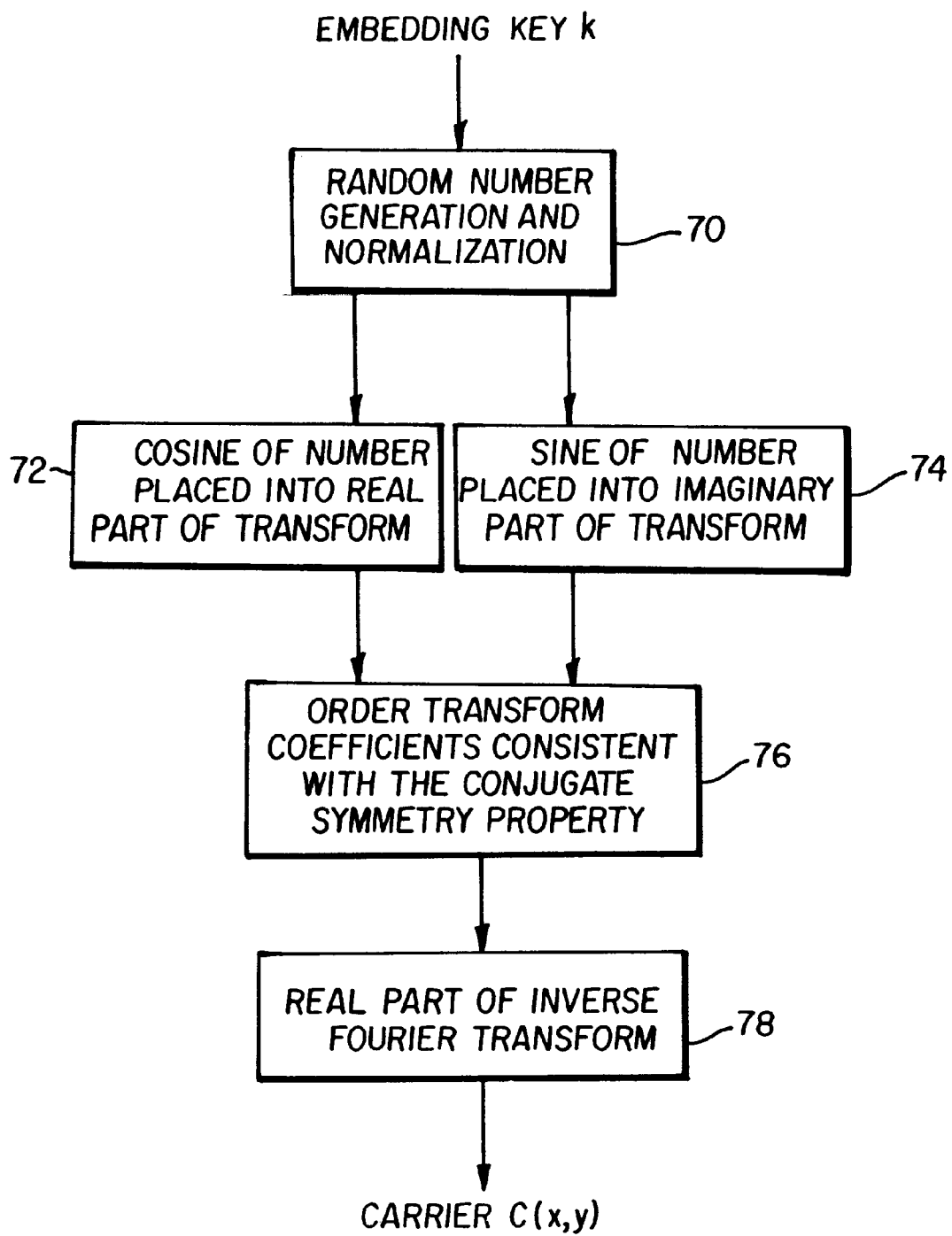
FIG. 7 illustrates in block diagram form, means for generating a carrier signal.

The carrier signal $C(x, y)$ is produced by a carrier generator 18 based upon a string of numbers representing the embedding key k that acts as a seed to a random number generator internal to carrier generator 18 and illustrated in detail in FIG. 7. Because the carrier is based on a random number generator using an embedded key value, the process of embedding data with this method provides a certain level of security to the embedded information. That is, it is very difficult for an unauthorized individual to extract the embedded information without the key. As discussed later in this section, additional security could be provided by further encrypting the meta-data using a cryptographically strong system prior to the embedding process.

The output of the convolver 16 is directed to an embedded data amplitude scaler 12. The scaler 12 also receives as an input the amplitude scaling factor α. Scaler 12 scales the output of the convolver according to α, producing the spatial domain scaled embedded data E(x, y).

The scaled embedded data values E(x, y) and the original image pixel values I(x, y) are sent to modulo-N summator 10, where $N=2^n$ for n-bit input pixel values. The summation performed by the modulo-N summator 10 combines the two inputs at all corresponding spatial locations to provide a stream of original pixel values modified with corresponding embedded pixel values, denoted as I(x, y)+E(x, y). Each value in this modified stream is represented with n bits.

Figure 2:
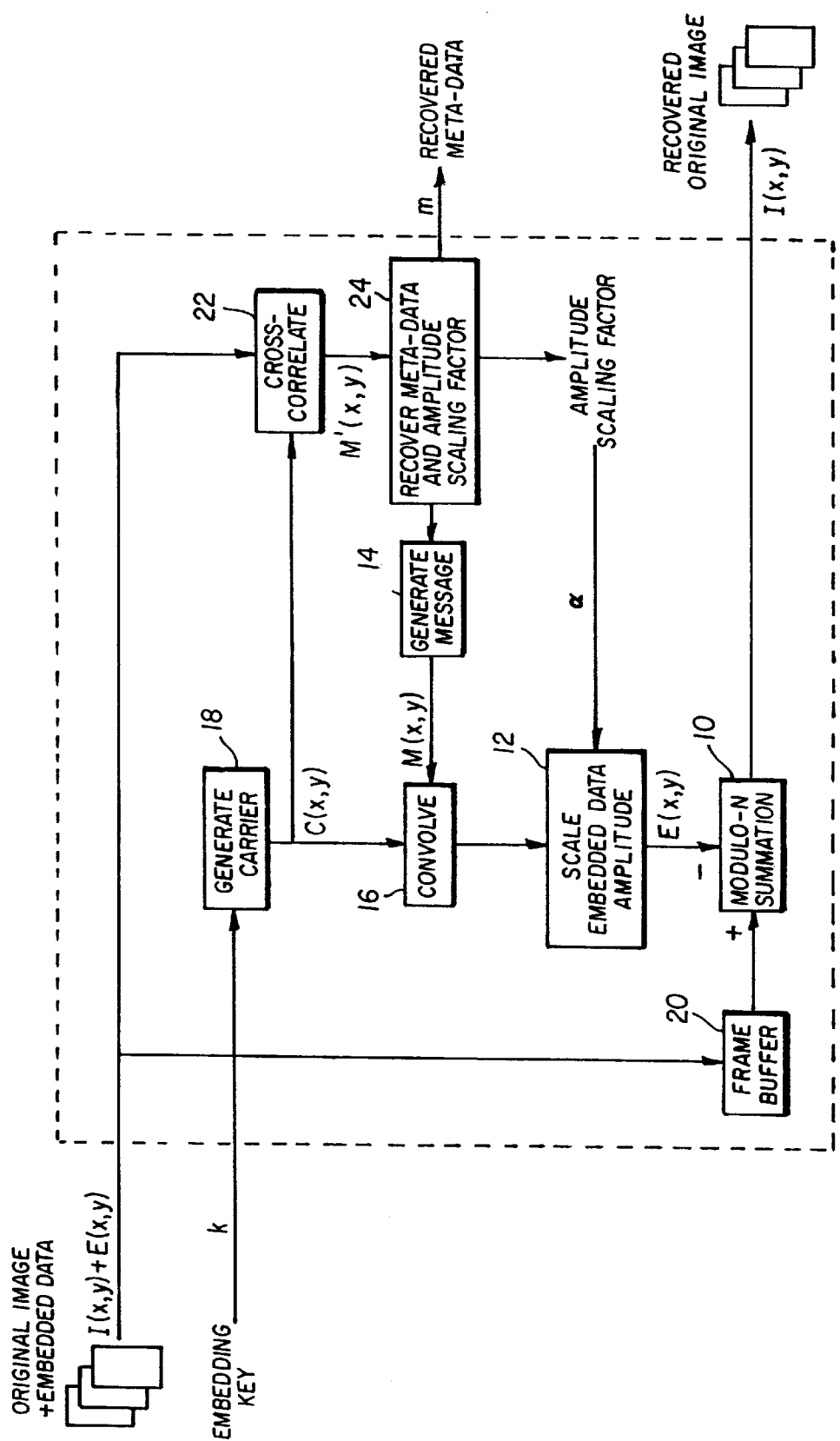
FIG. 2 illustrates in block diagram form, means for extracting meta-data information and recovering an original image from a digital image containing embedded data.

Referring now to FIG. 2, wherein embedded message extraction and recovery of the original image data are illustrated. The inputs to the embedded message extraction and image recovery apparatus are: 1) the n-bit per pixel stream representing the combination of the original image I(x, y) and its embedded data E(x, y); and 2) the string of values representing the same embedding key k used for the data embedding process in FIG. 1. It is noted that the received image containing the embedded data is directly viewable at this point without any special processing. The image with its embedded data stream is directed to a frame buffer 20 and also to a cross-correlator 22.

The embedding key k is sent to a carrier generator 18 that is identical to that used in FIG. 1. The resulting carrier signal C(x, y) is sent to cross-correlator 22 and a convolver 16. The cross-correlator 22 performs a circular cross-correlation on the carrier signal C(x, y) and the image and embedded message stream I(x, y)+E(x, y) to produce the recovered message M'(x, y).

The recovered message is then sent to recovery circuit 24 which recovers the meta-data information m and the amplitude scaling factor α. The recovered meta-data information and amplitude scaling factor are sent to message generator 14, which is the same as that used in FIG. 1. The output of message generator 14 is the same message M(x, y) produced in FIG. 1. M(x, y) is convolved with the carrier signal C(x, y), and the output is sent to embedded data scaler 12. Scaler 12 also receives the amplitude scaling factor a that was recovered by circuit 24. The output of scaler 12 is the scaled embedded data E(x, y).

The scaled embedded data is sent to a modulo-N summator 10, where it is subtracted from the combined image data and embedded message data that has been stored in frame buffer 20. The frame buffer 20 synchronizes the appearance of like pixels at the inputs of the modulo-N summator 10. The output of the summation apparatus is a stream of n-bit pixel values that is identical to the original pixel values I(x, y).

Figure 3:
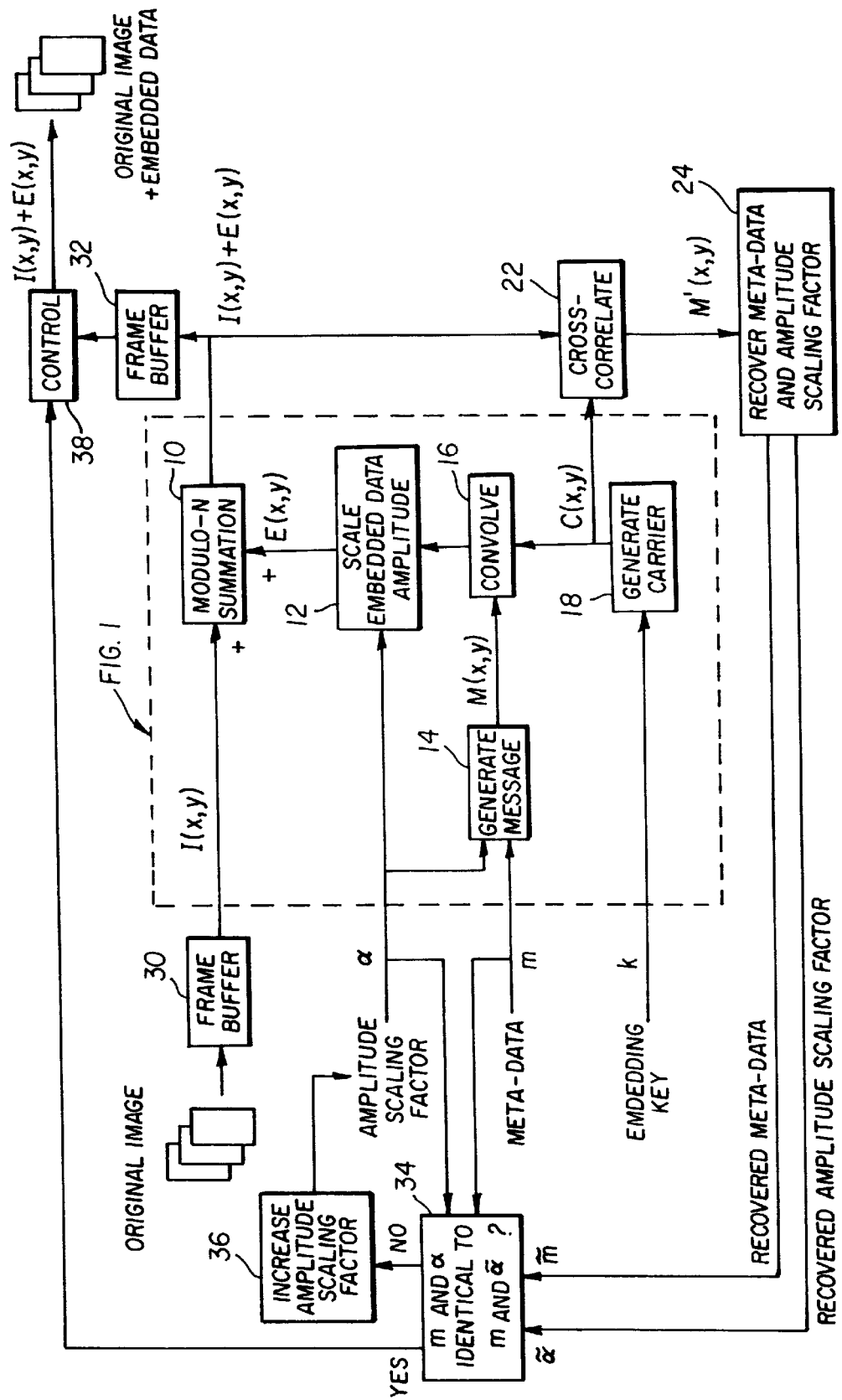
FIG. 3 illustrates in block diagram form, means for performing a dynamic adjustment of the embedded data amplitude to ensure exact recovery of the original image data.

As discussed previously, it is desirable to limit the maximum amplitude of the embedded data to minimize any visual artifacts in the image representing the combined original image and embedded data On the other hand, it is necessary to make the amplitude large enough to ensure exact recovery of the original message and subsequent exact recovery of the original image. Referring now to FIG. 3, a system is shown that iteratively adjusts the embedded data amplitude scaling factor α to produce the minimum value that ensures exact recovery of the original image. This system ensures exact recovery of the original image by ensuring the exact recovery of the meta-data that is embedded in the original image. These two conditions are identical.

In this embodiment, the amplitude scaling factor is first set to some minimum value. This initial minimum value can be chosen based on prior experience. Alternatively, to fully ensure that the absolute minimum value is used, it can be chosen so as to produce embedded data containing only the values ±1 (or 0 and ±1). The initial minimum value for the amplitude scaling factor α, the original image I(x, y), the meta-data information m, and the embedding key k are then sent as inputs to the same functional components used in FIG. 1 to produce data representing the combined original image data and the embedded data I(x, y)+E(x, y). The original image I(x, y) is also sent to a frame buffer 30 in order to allow repeated access to this data.

The combined original image data and the embedded data, I(x, y)+E(x, y) is sent to a frame buffer 32 in order to allow later access to this data. This data is also sent to a cross-correlator 22, which performs a like function of that performed by cross-correlator 22 in FIG. 2. The carrier signal produced by carrier generator 18 is also sent as input to the cross-correlator. The output of the cross-correlator is a recovered digital message M'(x, y).

The recovered digital message is then sent to a recovery circuit 24, which outputs recovered meta-data $\tilde{m}$ and a recovered amplitude scaling factor $\tilde{\alpha}$, where the indicates that these data may differ from the original meta-data m and amplitude scaling factor α. The recovered meta-data and recovered amplitude scaling factor are sent to comparison circuit 34, where they are compared to the original meta-data and amplitude scaling factor.

If the recovered meta-data $\tilde{m}$ and recovered amplitude scaling factor $\tilde{\alpha}$ are identical to the original meta-data m and the amplitude scaling factor α, then the amplitude scaling factor α was sufficiently large to ensure exact recovery of the original image data from the combined image and embedded data. In this case, a control signal is sent to control circuit 38 to allow the original image and embedded data to be removed from frame buffer 32 and sent as output. If $\tilde{m}$ and $\tilde{\alpha}$ are different from m and α, then a control signal is sent to circuit 36 to increase the amplitude scaling factor α. In this case, the embedded data is processed using the increased amplitude scaling factor, and the resulting recovered meta-data and recovered amplitude scaling factor are again compared to the original meta-data and amplitude scaling factor. This process is repeated until the amplitude scaling factor is sufficiently large to ensure exact recovery of the original image data.

Figure 4:
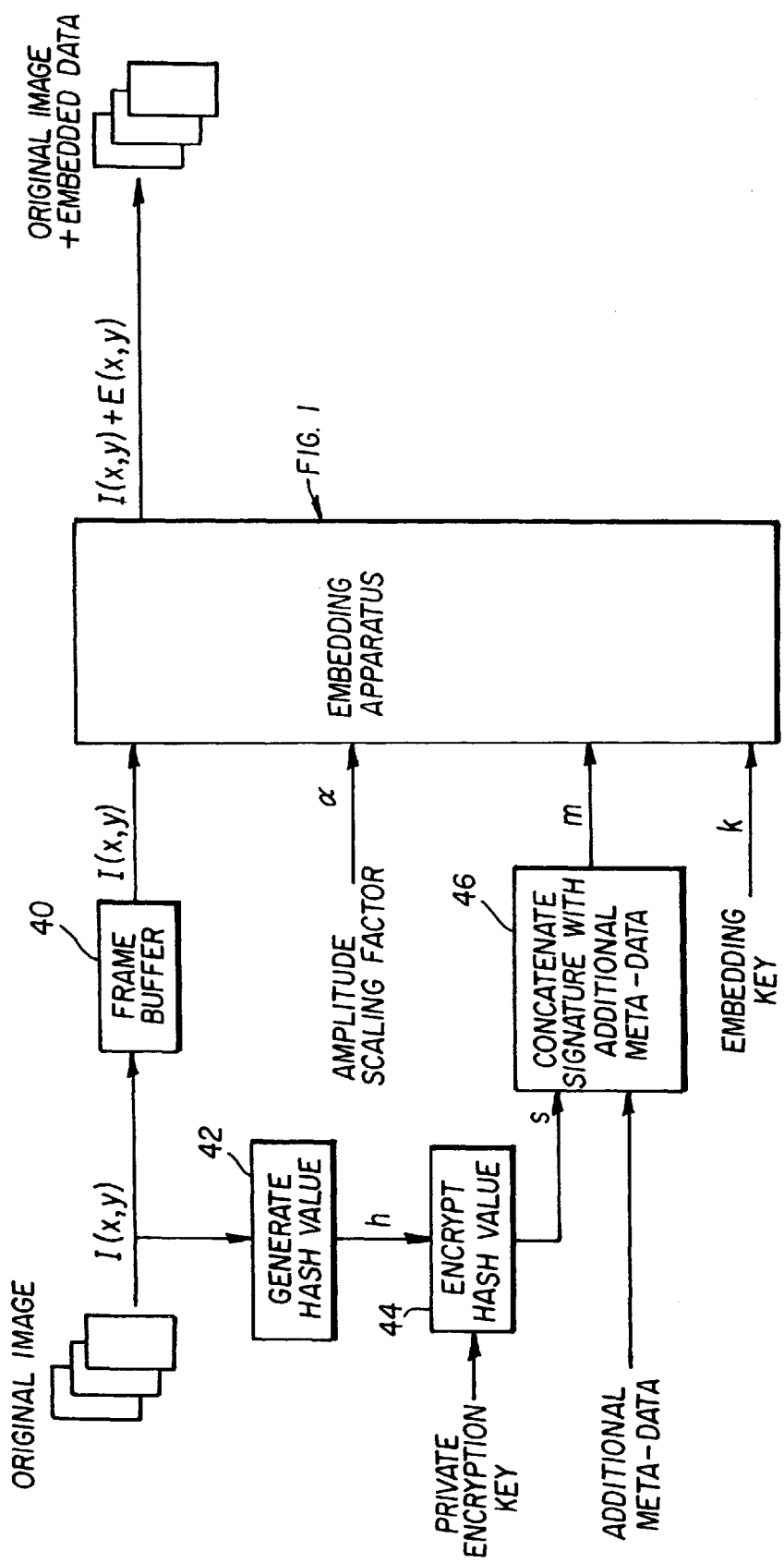
FIG. 4 illustrates in block diagram form, means for embedding a digital signature in an image in a manner that allows exact recovery of the original image and subsequent authentication.

FIG. 4 illustrates the use of the embedding apparatus of FIG. 1 for the specific case of embedding a digital signature. The original image I(x, y) is sent to a hash value generator 42, which produces a string of bits representing the hash value h through the use of a hashing function. An example of a useful hashing function is found in U.S. Department of Commerce Technology Administration National Institute of Standards and Technology, FIPS PUB 180, "Secure Hash Standard," May 11, 1993, pp. 1–20. This hashing function will produce hash value of length 162 bits, irrespective of the number of pixel values that are input to the hashing function. Other hashing functions may produce hash values of lengths other than 162 bits.

The hash value h is then directed to an encryption circuit 44. A string of values called an encryption key is also directed to the encryption circuit 44. The encrypted signal produced by circuit 44 resembles a random bit stream and is called the digital signature s of the original image I(x, y). In a cryptographically strong system, it is computationally infeasible to generate the correct signature without knowledge of the key. By making the encryption key available only to the authorized users (i.e., a private key), it can be assured that the signature cannot be duplicated by any unauthorized user. A variety of encryption methods are possible, including, a commercially available product from RSA Data Security Inc. called RC-4™. Further examples of methods used to generate cryptographically strong systems based on nonlinear combinations of linear feedback shift registers are described in the reference titled APPLIED CRYPTOGRAPHY, SECOND EDITION, PROTOCOLS, ALGORITHMS, AND SOURCE CODE IN C, "Pseudo-Random-Sequence Generators and Stream Ciphers," by Bruce Schneier, 1996, pp. 369–395.

The digital signature s is directed to a concatenator circuit 46 where the signature is combined with any additional meta-data that is to be embedded in the image. It is obvious that the additional meta-data could also be concatenated with the hash value prior to encryption, thus providing security for both the hash value and the meta-data, if desired. The combined signature and additional meta-data is then sent as the total meta-data input m to the FIG. 1 embedding apparatus.

The FIG. 1 embedding apparatus shown in FIG. 4 also receives the original image as input, which has been stored in a frame buffer 40 to synchronize the arrival of the image data with the meta-data input. The FIG. 1 apparatus further receives the amplitude scaling factor α and the embedding key k as described previously. The output of the FIG. 1 embedding apparatus is the image containing the embedded data (including the digital signature and any additional meta-data). It is noted that the apparatus shown in FIG. 3 could also be used to embed the digital signature information while ensuring that the embedded data amplitude is kept to a minimum.

Figure 5:
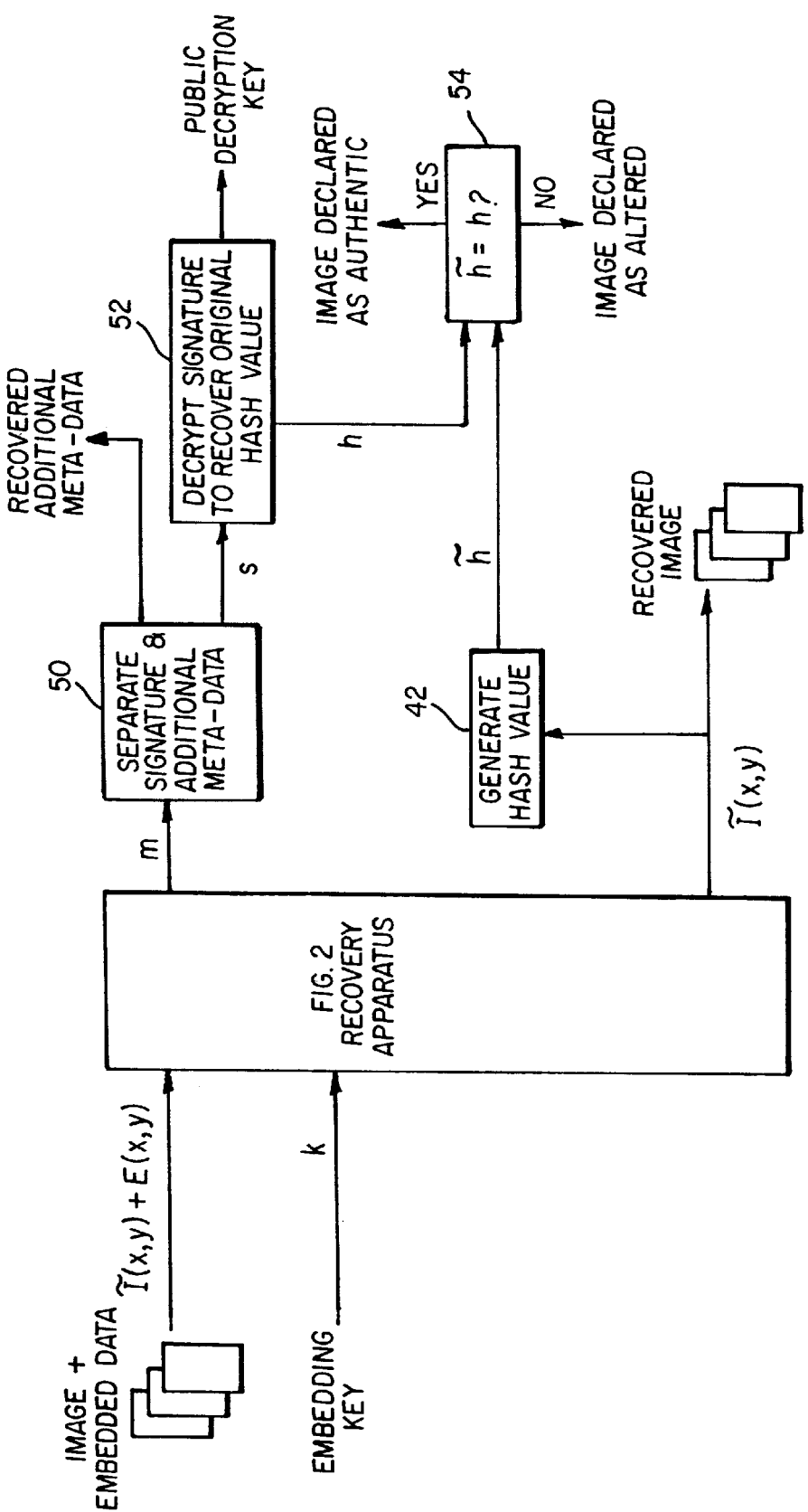
FIG. 5 illustrates in block diagram form, means for authenticating an image containing an embedded digital signature.

FIG. 5 illustrates the recovery of the digital signature from the embedded image data and its subsequent use in verifying the authenticity of the received image. The image containing the embedded data $\tilde{I}(x, y)+E(x, y)$ is directed as input to the FIG. 2 recovery apparatus, where $\tilde{I}(x, y)$ indicates that the received image may be an altered version of the original image $I(x, y)$. The embedding key k is also sent as input to the FIG. 2 apparatus. The outputs of the FIG. 2 apparatus are the recovered (and potentially altered) image $\tilde{I}(x, y)$ and the total embedded meta-data information m, which includes the digital signature.

The total meta-data information is directed to a separator circuit 50 that separates the meta-data information into the digital signature s and any additional meta-data. The signature is then sent to a decryption circuit 52 where the original hash value h is recovered. The decryption circuit also requires a string of values called a decryption key. As noted previously, it is common for the encryption key to be held privately so that only authorized users can create valid signatures. However, the corresponding decryption key is often made public so that any individual can authenticate an image given its digital signature. Such a system is called a private/public key system.

The recovered image $\tilde{I}(x, y)$ is sent to a hash value generator 42 that is identical to that used in FIG. 4. The resulting hash value $\tilde{h}$ is directed to a hash value comparator circuit 54 where it is compared to the original hash value recovered from the meta-data. If the hash values are identical, then the recovered image is declared to be authentic. If they differ, the recovered image is declared to be altered.

Although the preceding descriptions of the invention have discussed the authentication process in terms of the entire image, it is useful to point out that authentication can be applied independently to sub-regions within an image. That is, the original image can be broken down into sub-regions, where each sub-region has its own digital signature (or other meta-data), which is then embedded into that sub-region. For example, it has been found that a significant number of bits can be embedded and robustly recovered using the described methods in sub-regions as small as 128×128 pixels or even 64×64 pixels. This method of independently authenticating image sub-regions has the advantage that any tampering with the image can subsequently be localized to a specific sub-region(s). Furthermore, this method also allows for only certain sub-regions to be authenticated (e.g., sub-regions identified as containing important information), thus reducing the number of computations in certain applications.

As discussed previously, the design of the carrier signal $C(x, y)$ used in the embedding process is crucial to the performance of the present invention. It is desirable to ensure that the carrier amplitude spectrum is constant or flat so that the auto-correlation of the carrier approximates a delta function. Because of this desired property, the carrier signal is constructed in the Fourier frequency domain. The Fourier phase of the spectrum should be random to simultaneously provide a basis for a cryptographically secure system and to ensure that the message data is spatially dispersed after convolution with the carrier. Source code for the carrier generation is provided in Appendix I in the computer language C++.

To construct a Fourier spectrum with these properties, we first note that the numbers in the Fourier domain are complex quantities, possessing both real and imaginary values. Alternatively, a complex number can be represented by its phase and magnitude. Given a complex quantity $F(u, v)$ at the spatial frequency location $(u, v)$, the real and imaginary parts of $F(u, v)$ is related to its phase and magnitude by the following formulas:

$$Re[F(u,v)] = \text{Magnitude} \cdot \cos(\text{phase}) \qquad \text{Equation 6}$$

$$Im[F(u,v)] = \text{Magnitude} \cdot \sin(\text{phase}) \qquad \text{Equation 7}$$

Consequently, setting the magnitude of the Fourier frequency components to unity at all frequencies will result in a flat spectrum. Also, since we wish the carrier data to be real we impose on its Fourier transform an additional constraint known as conjugate symmetry (see DIGITAL IMAGE PROCESSING by William K. Pratt, Second Edition, pp. 196–200) as defined below:

$$F(u,v) = F^*(-u+iL, -v+jL), \qquad \text{Equation 8}$$

where F* denotes the operation of taking the complex conjugate of F, L is the one-dimensional block length of the carrier signal (typically equal to 128 in a preferred embodiment), and $i, j = 0, \pm 1, \pm 2, \pm 3, \ldots$.

Figure 6:
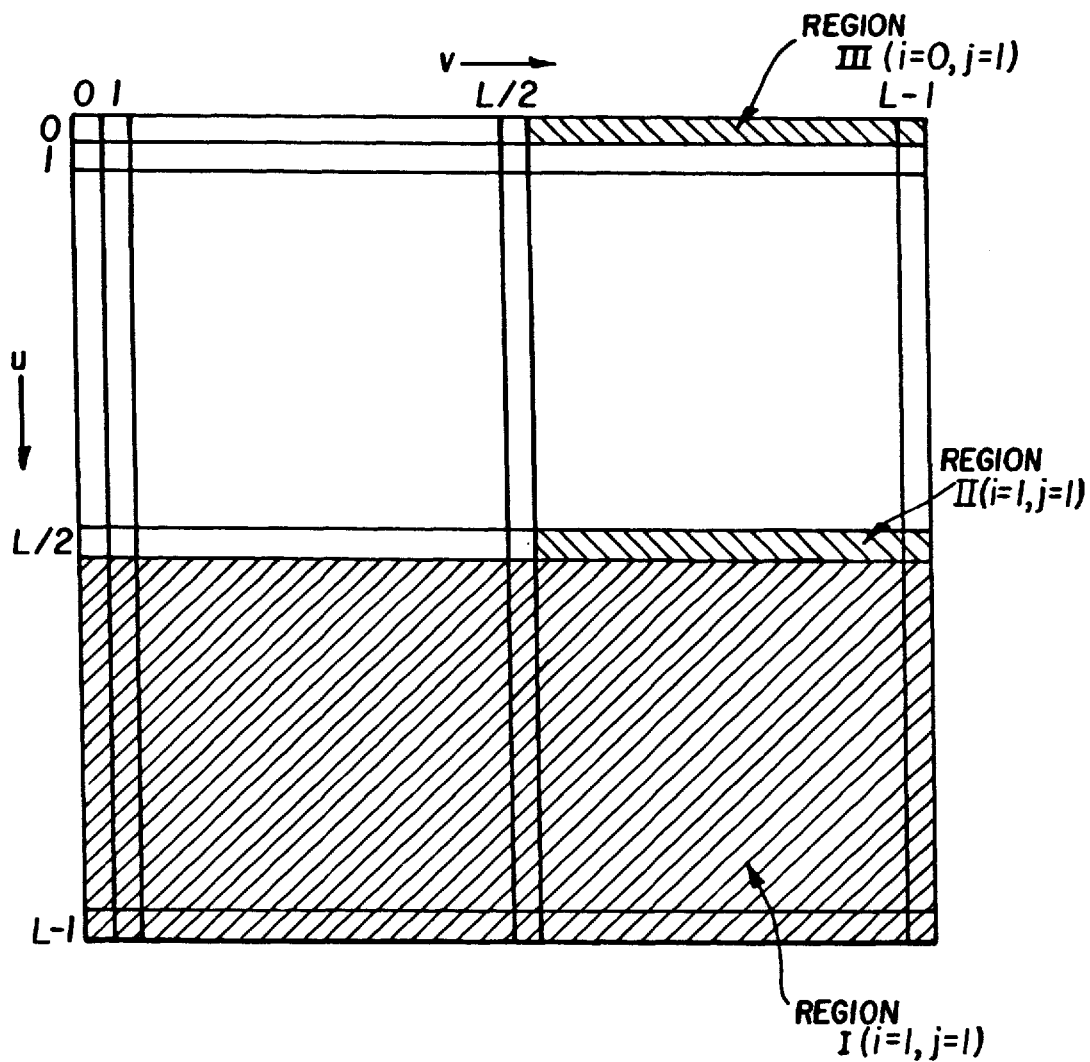
FIG. 6 illustrates the redundant and the non-redundant parts of a Fourier transform subject to a conjugate symmetry constraint in the frequency domain.

The conjugate symmetry constraint implies that only about half of the Fourier components need to be specified, and that the remaining half may be constructed based on the symmetry conditions. Conjugate symmetry is illustrated in FIG. 6, where the cross-hatched regions show the redundant components of the transform and the remaining region designates the non-redundant components. To generate a carrier with the desired properties, we need only specify the phase and the amplitude of the non-redundant portions of the Fourier transform and compute the rest of the components by using the appropriate values of the indices i and j in the conjugate symmetry relationship given in Equation 8.

FIG. 7 illustrates the functional flow for carrier generator 18 of FIGS. 1 and 2. The embedding key k is directed to the input of a random number generator 70. In a preferred embodiment, the embedding key is used in a private-key encryption system to generate a stream cipher that resembles a random bit stream. Examples of such systems can be found in the reference titled APPLIED CRYPTOGRAPHY, SECOND EDITION, PROTOCOLS, ALGORITHMS, AND SOURCE CODE IN C, "Pseudo-Random-Sequence Generators and Stream Ciphers," by Bruce Schneier, 1996, pp. 369–395. By making the embedding key available only to authorized users, it can be assured that the carrier signal cannot be duplicated by any unauthorized user.

For each frequency location in the non-redundant part of the Fourier transform, a portion of the random bit stream produced by random number generator 70 is converted into a random phase value for the carrier signal. Depending on the accuracy desired, the bit stream can be broken into P-bit blocks, and each block of P bits is mapped into a number that is uniformly distributed between 0 and 360 degrees. For example, for P=10, the interval between 0 and 360 degrees can be divided into 1024 equal subintervals, where each subinterval is randomly (and with a uniform probability) chosen based on the 10-bit value.

The output of the random number generator 70 is normalized to ensure that it is between 0 and 360 degrees in phase, or equivalently, between 0 and $2\pi$ radians. The cosine of the phase is placed into the real part of the transform 72, and the sine of the phase is placed into the imaginary part of the transform 74. It should be mentioned that the amplitude is automatically flat since:

$$\text{Amplitude} = \sqrt{\text{real}^2 + \text{imaginary}^2} \quad \text{Equation 9}$$
$$= \sqrt{\cos(\text{phase})^2 + \sin(\text{phase})^2} = 1$$

To calculate values for the redundant part of the Fourier spectrum, the conjugate symmetry given in Equation 8 is used. This assumes that the non-redundant part of the transform has been calculated. FIG. 6 shows that the redundant part of the transform may be divided into three regions, Region I, Region II, and Region III. The values i and j in Equation 8 must be specified in advance and must ensure that the resultant arguments in the term, $F^*(-u+iL,-v+jL)$, correspond to a non-redundant region. The following is a specification for i and j which works for all values of L.

The lower region, Region I, of the redundant part of the spectrum is calculated using i=1 and j=1 in the conjugate symmetry formula. Region II appears on the middle right side of FIG. 6. This region is also calculated by using i=1 and j=1 in the conjugate symmetry formula. Region III appears on the upper right side of FIG. 6. This region is calculated by using i=0 and j=1 in the conjugate symmetry formula As a further refinement, it is known that the Fourier amplitude spectrum of imagery is much larger in the very lowest frequencies when compared to their higher frequencies. Since the cross-correlation process (message extraction) may be described in the frequency domain as the product of two functions' amplitude spectra and the subtraction of their respective phases, the impact of the image on the recovered message may further be reduced by reducing the Fourier amplitude of the lowest frequencies of the carrier. The preferred embodiment of this improvement is to increase the amplitude from zero amplitude to a constant value (here the constant value is 1.0), starting at DC (or zero frequency) to 1/16th of the Nyquist frequency. In our software implementation, the frequency arrangement shown in FIG. 6 is rearranged so that DC (or zero frequency) occurs at the center of the spectrum at point (L/2,L/2). This rearrangement may be effected by temporarily interchanging the lower right quadrant with the upper left quadrant and interchanging the lower left quadrant with the upper right quadrant. This enables us to directly express frequency as a function of distance from (L/2,L/2), whereas in the former frequency arrangement, references to each quadrant must be dealt with independently. Given this arrangement, our algorithm first introduces a variable called ramp_radius which is equal to the value Nyquist/16 (which for L=128 is equal to 4) and then calculates for each frequency (u, v) less than ramp_radius:

1) The distance, radius, from DC:

$$\text{radius} = \sqrt{(u-L/2)^2 + (v-L/2)^2} \quad \text{Equation 10}$$

2) A value:

$$\text{multiplier} = (1-(\text{ramp\_radius}-\text{radius})/\text{ramp\_radius})^2 \quad \text{Equation 11}$$

3) A modified value for F(u, v):

$$\text{Re}[F(u,v)] = \text{multiplier} \cdot \text{Re}[F(u,v)] \quad \text{Equation 12}$$

$$\text{Im}[F(u,v)] = \text{multiplier} \cdot \text{Im}[F(u,v)] \quad \text{Equation 13}$$

These modified transform coefficients are ordered in a manner consistent with conjugate symmetry property using circuit 76 in FIG. 7. Finally, the inverse Fourier transform of these coefficients is computed, and the real part is taken as the carrier signal C(x, y) using circuit 78 in FIG. 7. In practice, by constructing the carrier with the methods described in the present invention, the carrier will be uncorrelated with the image, and hence the effect of the cross-correlation of the image and the carrier on the recovered image will be negligible.

Figure 8:
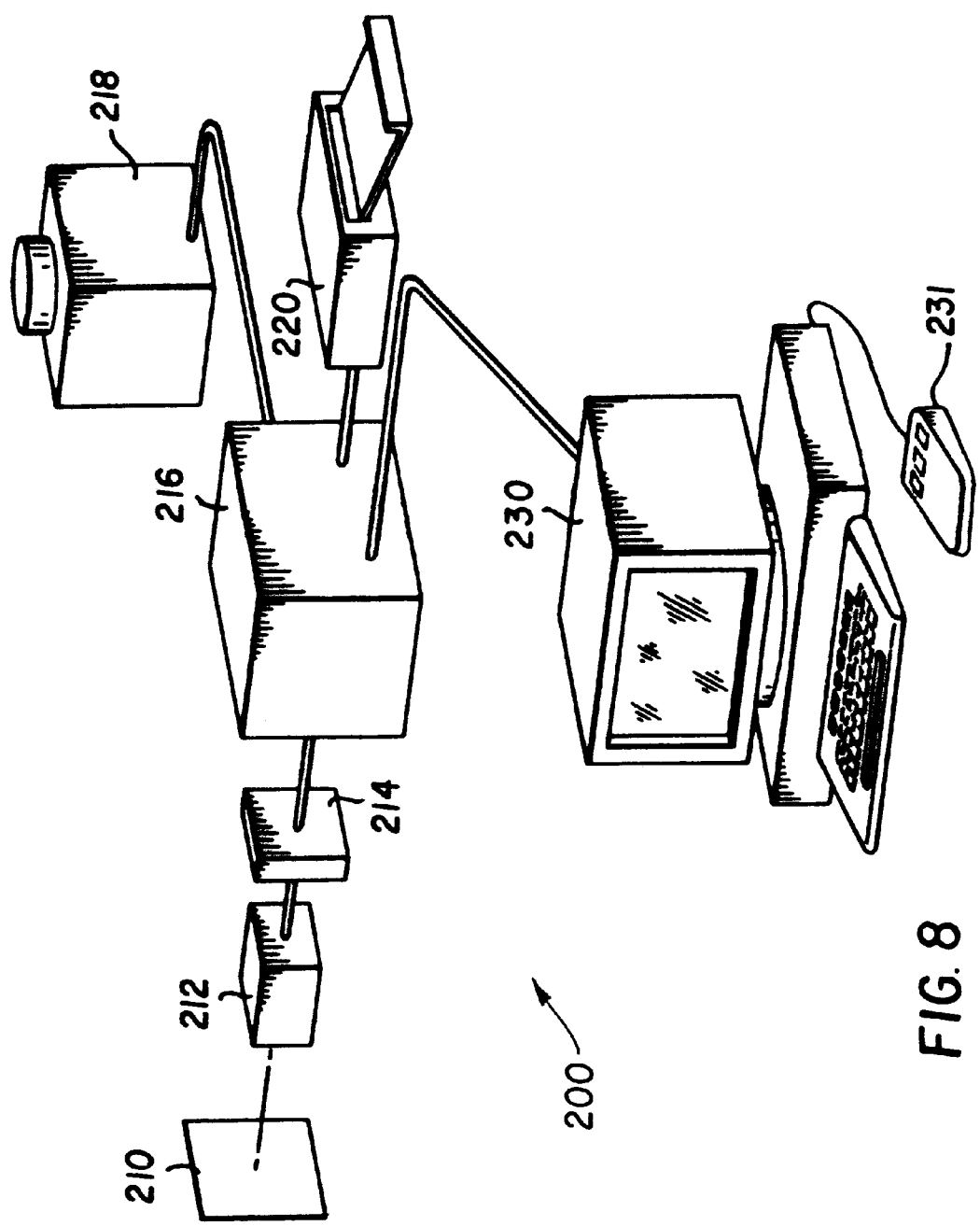
FIG. 8 is a perspective view of a system on which the present method may be practiced.

Referring to FIG. 8, a system 200 on which the present invention is practiced scans an image 210, via a scanner 212, and converts the scanned image to a digital image using an analog-to digital converter 214. The analog-to-digital converter 214 may be part of the scanner 212. The digitized image is forwarded to a processor 216 wherein it is operated upon in accordance with the apparatus of the present invention. A monitor 230 and mouse 231, or other input device, enables an operator to interface with the image in its digital form. The processed image may be stored in a memory 218 and/or printed out using a printer 220.

The invention has been described with reference to a preferred embodiment. However, it will be appreciated that variations and modifications can be effected by a person of ordinary skill in the art without departing from the scope of the invention.

PARTS LIST 10 modulo-N summator
12 data amplitude scaler
14 message generator
16 convolver
18 carrier generator
20 frame buffer
22 cross-correlator
24 recovery circuit
30 frame buffer
32 frame buffer
34 comparison circuit
36 amplitude scaling factor adjuster
38 buffer control circuit
40 frame buffer
42 hash value generator
44 encryption circuit
46 concatenator circuit 50 separator circuit
52 decryption circuit
54 hash value comparator circuit
70 random number generator
72 cosine of number placed into real part of Fourier transform
74 sine of number placed into imaginary part of Fourier transform
76 conjugate symmetry coefficient ordering circuit
78 real part of inverse Fourier transform circuit 200 system
210 image
212 scanner
214 analog-to-digital converter
216 processor
218 memory
220 printer
230 monitor
231 mouse

APPENDIX I

Source Code To Produce An Improved Carrier Signal

```
#include "image.h"
double pi2=8.*atan(1.);
#define get_rand() (double)pi2*rand()/(RAND_MAX)
void main(int argc, char *argv[])
{
    if(argc<2)
    {
        printf("\n\nUsage: carrier random_seed block_size [ramp_radius]\n");
        exit(1);
    }
    else
    {
        int random_seed = atoi( argv[1]);
        int block_size = atoi(argv[2]);
        double val,r,i,rl,i1;
        int p,1,pp=block_size,p2=block_size/2;
        int 11=block_size,12=block_size/2;
        // Initialize an image w/ 1 color plane, pp pixels wide, 11 lines long
        // and 32 bits per pixel deep (floating point)
        // This image will be used to store imaginary values
        image imaginary(1,pp,11,32);
        // Initialize an image w/ 1 color plane, pp pixels wide, 11 lines long
        // and 32 bits per pixel deep (floating point)
        // This image will be used to store real values
        image real(1,pp,11,32);
        //Initialize the random number generator
        srand(random_seed);
        // The Fourier amplitude spectrum of imagery is much larger in the
        // very lowest frequencies when compared to their higher
        //frequencies. Since the cross-correlation process (message
        //extraction) may be described in the Frequency domain as the
        // product of two functions' amplitude spectrums and the
        //subtraction of their respective phases, the impact of the image on
        //the recovered message may further reduced by making the
        //carriers' Fourier amplitude of the lowest frequencies smaller.
        // Initaiize the bounding radius
        double ramp_radius=0;
        if(argc==4) ramp_radius=atof(argv[3]);
        printf("\nShall start zeroring frequencies at r=0.0 and end at r = % 15.5f\n", ramp_radius);
        double x;
        int ix,iy;
        double vx,vy;
        // "1" represents line position
        // "p" represents pixel position
        // Fill in non-redundant upper quadrants
        // Go ahead an fill in small strip in upper right
        //quadrant which is redundant since it will be
        // overwritten anyway in the next loop
        for( 1=0;1<=12; 1++)
        {
            for(p=0;p<block_size;p++)
            {
                x=(double) pi2*rand()1/RAND_MAX);
                vx = cos(x);
                vy = sin(x);
                real.put_pixel(vx,0,p,1);
                imaginary.put_pixel(vy,0,p,1);
            }
        }
        // Fill in strip in upper right quadrant which is redundant
        // i.e. (block_size/2+1,0)->(block_size-1,0)
```

APPENDIX I-continued

Source Code To Produce An Improved Carrier Signal

```
            // Set line number to zero
            1=0;
            for(p=(block_size/2+1);p<block_size;p++)
            {
                    // Get a mirrored point from left
                    vx=real.get_pixel(0,block size-p,0-1);
                    vy=-imaginary.get_pixel(0,block_size-p,0-1);
                    real.put_pixel(vx,0,p,1);
                    imaginary.put_pixel(vy,0,p,1);
            }
            // Fill in redundant lower two quadrants
            for( 1=(12+1);1<block_size; 1++)
            {
                for(p=0;p<block_size;p++)
                    vx=real.get_pixel(0,block_size-p,block_size-1);
                    vy=-imaginary.get_pixel(0,block_size-p,block_size-
                    real.put_pixel(vx,0,p,1);
                    imaginary.put_pixel(vy,0,p,1);
                }
            }
// Finish up by filling redundant strip (block_size/2+1,block_size/2)-
// >(block_size-1,block_size/2)
            // Set line number to zero
        1=block_size/2;
            for(p=(block_size/2+1);p<block_size;p++)
            {
                    vx=real.get_pixel(0,block_size-p,block_size-1);
                    vy=imaginary.get_pixel(0,block_size-p,block_size-
                    1);
                    real.put_pixel(vx,0,p,1);
                    imaginary.put_pixel(vy,0,p,1);
            }
            // Now orient the data so that DC appears at the center
            real.orient();
            imaginary.orient();
            double radius=0.0;
            if(ramp_radius>0)
            {
                printf("\nBuilding quadratic ramp\n");
                for(1=0;1<11;1++)
                {
                for(int p=0;p<pp;p++)
                    {
                        radius = (p-p2)*(p-p2)+(1-12)*(1-12);
                        radius = pow( radius, .5);
                        if(radius <=ramp_radius)
                        {
                            val = real.get_pixel( 0, p,1);
                            val *= pow( (1.0-(ramp_radius -
                            radius )/ramp_radius),2);
                            real.put_pixel(val,0,p,1);
                            val = imaginary.get_pixel( 0,
                            p,1);
                            val *= pow( (1.0-(ramp_radius -
                            radius )/ramp_radius),2);
                            imaginary.put_pixel(val,0,p,1);
                        }
                    }
                }
            }
            // Take the inverse fourier transform
            _fft(&real,&imaginary,-1);
            // Note that the above function_fft(&real,&imaginary,-1)
            // has replaced the images real and imaginary with the inverse
            // fourier transform -- so all we have to do is save the image real.
            char out[128];
            sprintf(out,"carrier.tif");
            real.save(out);
    }
}
```

What is claimed is:

1. A method for embedding metadata in and recovering meta-data from an n-bit original digital image, comprising the steps of:

a) forming a digital message from meta-data;

b) converting the digital message to embedded data;

c) adding the embedded data to the original image, pixel by pixel, using Modulo-N arithmetic, where $N=2^n$, to form an n-bit modified digital image containing the embedded data such that the original digital image can always be exactly recovered given the modified image and the embedded data;

d) extracting the embedded data from the modified digital image; and e) recovering exactly the original image by subtracting the embedded data from the modified image, pixel by pixel, using Modulo-N arithmetic, where $N=2^n$.

2. The method according to claim 1, wherein the meta-data is a digital signature for the original n-bit digital image formed by the steps of:

i) generating a hash value from the original n-bit digital image; and ii) encrypting the hash value using a private key to form the digital signature.

3. The method according to claim 1, further comprising the steps of:

i) separating the original n-bit digital image into sub-regions; and ii) applying the steps of claim 1 to each sub-region.

4. The method according to claim 2, further comprising the steps of:

i) separating the original n-bit digital image into sub-regions; and ii) applying the steps of claim 2 to each sub-region.

5. A method for embedding meta-data into an original n-bit digital image that allows exact recovery of the original image, comprising the steps of:

a) forming a digital message from meta-data;

b) converting the digital message to embedded data; and c) adding the embedded data to the original image, pixel by pixel, using modulo-N addition to form an n-bit digital image containing the embedded data.

6. The method according to claim 5, wherein the meta-data is a digital signature for the original n-bit digital image formed by the steps of:

i) generating a hash value from the original n-bit digital image; and ii) encrypting the hash value using a private key to form the digital signature.

7. A method for embedding meta-data into an original n-bit digital image that allows exact recovery of the original image, comprising the steps of:

a) forming a digital message from meta-data;

b) converting the digital message to embedded data;

c) modifying the amplitude of the embedded data to form scaled embedded data; and d) adding the scaled embedded data to the original image, pixel by pixel, using modulo-N addition to form an n-bit digital image containing the embedded data.

8. The method according to claim 7, wherein the meta-data is a digital signature for the original n-bit digital image formed by the steps of:

i) generating a hash value from the original n-bit digital image; and ii) encrypting the hash value using a private key to form the digital signature.

9. A method for embedding meta-data into an original n-bit digital image that allows recovery of the original image, comprising the steps of:

a) forming a digital message from meta-data;

b) generating a random phase carrier based on a private or public key;

c) convolving the digital message and the random phase carrier to form embedded data;

d) scaling the embedded data with an amplitude scaling factor to form scaled embedded data; and e) adding the scaled embedded data to the original image, pixel by pixel, using modulo-N addition where $N=2^n$ to form an n-bit digital image containing the scaled embedded data.

10. The method according to claim 9, wherein the meta-data is a digital signature for the original n-bit digital image formed by the steps of:

i) generating a hash value from the original n-bit digital image; and ii) encrypting the hash value using a private key to form the digital signature.

11. The method according to claim 9, wherein the amplitude scaling factor is included in the meta-data that is embedded in the original n-bit digital image.

12. The method according to claim 11, wherein the amplitude scaling factor is dynamically adjusted, comprising the additional steps of:

g) setting the amplitude scaling factor to an initial minimum value;

h) embedding the meta-data into the original image to form an n-bit image containing scaled embedded data;

i) cross-correlating the random phase carrier with the n-bit image containing scaled embedded data to form a recovered digital message;

j) extracting test meta-data from the recovered digital message;

k) comparing the test meta-data with the meta-data to determine equivalence;

l) increasing the amplitude scaling factor if equivalency is not met; and m) repeating steps h) through l) until equivalency is met.

13. A method for recovering an original n-bit digital image and associated meta-data from a received n-bit digital image containing embedded data representing a digital message, comprising the steps of:

a) recovering the digital message from the received n-bit digital image;

b) extracting the meta-data from the recovered digital message;

c) converting the recovered digital message to embedded data; and d) adding the embedded data to the received n-bit digital image, pixel by pixel, using Modulo N-arithmetic, where $N=2^n$, to form a recovered original n-bit digital image.

14. The method according to claim 13, wherein the meta-data is a digital signature for the original n-bit image, comprising the additional steps of:

e) decrypting the signature from the meta-data using a public key to recover the original hash value;

f) generating a test hash value from the recovered original image; and g) comparing the test hash value with original hash value to authenticate the recovered original image.

15. The method according to claim 13, further comprising the steps of:

i) separating the received n-bit digital image into sub-regions; and ii) applying the steps of claim 13 to each sub-region.

16. The method according to claim 14, further comprising the steps of:

i) separating the received n-bit digital image into sub-regions; and ii) applying the steps of claim 14 to each sub-region.

17. A method for recovering an original n-bit digital image and associated meta-data from a received n-bit digital image containing embedded data representing a digital message, comprising the steps of:

a) recovering the digital message from the received n-bit digital image;

b) extracting the meta-data from the recovered digital message;

c) converting the recovered digital message to embedded data; and d) subtracting the embedded data from the received n-bit digital image using modulo-N subtraction, where $N=2^n$, to form a recovered original n-bit digital image.

18. The method according to claim 17, wherein the meta-data is a digital signature for the original n-bit image, comprising the additional steps of:

e) decrypting the signature from the meta-data using a public key to recover the original hash value;

f) generating a test hash value from the recovered original image; and g) comparing the test hash value with original hash value to authenticate the recovered original image.

19. A method for recovering an original n-bit digital image and associated meta-data from a received n-bit digital image containing scaled embedded data representing a digital message, comprising the steps of:

a) recovering the digital message from the received n-bit digital image;

b) extracting the meta-data from the recovered digital message;

c) converting the recovered digital message to embedded data;

d) modifying the amplitude of the embedded data to form scaled embedded data; and e) subtracting the scaled embedded data from the received n-bit digital image, pixel by pixel, using modulo-N subtraction, where $N=2^n$, to form a recovered original n-bit digital image.

20. The method according to claim 19, wherein the meta-data is a digital signature for the original n-bit image, comprising the additional steps of:

f) decrypting the signature from the meta-data using a public key to recover the original hash value;

g) generating a test hash value from the recovered original image; and h) comparing the test hash value with original hash value to authenticate the recovered original image.

21. A method for recovering an original n-bit digital image and associated meta-data from a received n-bit digital image containing scaled embedded data, comprising the steps of:

a) generating a random phase carrier based on a private or public key;

b) cross-correlating the random phase carrier with the received n-bit digital image to form a recovered digital message;

c) extracting the meta data from the recovered digital message;

d) convolving the recovered digital message and the generated random phase carrier to form embedded data;

e) scaling the embedded data with an amplitude scaling factor to form scaled embedded data; and f) subtracting the scaled embedded data from the received n-bit digital image, pixel by pixel, using modulo-N subtraction, where $N=2^n$, to form a recovered original n-bit digital image.

22. The method according to claim 21, wherein the meta-data is a digital signature for the original n-bit image, comprising the additional steps of:

g) decrypting the signature from the meta-data using a public key to recover the original hash value;

h) generating a test hash value from the recovered original image; and i) comparing the test hash value with original hash value to authenticate the recovered original image.

23. The method according to claim 21, wherein the amplitude scaling factor included in the meta-data is extracted from the recovered digital message by the step of, recovering the amplitude scaling factor from the extracted meta-data.

24. The method claimed in claim 9, wherein the step of scaling the embedded data with an amplitude scale factor further includes multiplying the embedded data by a scale factor $\alpha$, where $\alpha$ is chosen such as to make the embedded data visually undetectable when combined with the original image.

25. The method claimed in claim 24, further comprising the step of including the scale factor in the original image.

26. A method for embedding and recovering meta-data into an original n-bit digital image, comprising the steps of:

a) forming a digital message from meta-data;

b) converting the digital message to embedded data by convolving the digital message with a carrier;

c) adding the embedded data with the original image, pixel by pixel, using Modulo N-arithmetic, where $N=2^n$, to create an n-bit digital image containing the embedded data;

d) recovering the digital message by correlating the original image containing the embedded data with the carrier;

e) recreating the embedded data by convolving the recovered digital message with the carrier; and f) subtracting the recreated embedded data from the original image, pixel by pixel, having the embedded data within, and using the Modulo N-arithmetic to exactly recover the original image.

\* \* \* \* \*